United States Patent

Soulant, Jr. et al.

[15] 3,636,437

[45] Jan. 18, 1972

[54] METHODS FOR MAGNETICALLY MEASURING STRESS USING THE LINEAR RELATIONSHIP OF THE THIRD HARMONIC TO STRESS

[72] Inventors: Herman A. Soulant, Jr., 501 Gilscot Pl., Rockville, Md. 20851; Henry C. Brisker, 14112 Sturtevant Road, Silver Spring, Md. 20904

[22] Filed: Aug. 25, 1970

[21] Appl. No.: 66,750

[52] U.S. Cl. ............................................. 324/34 ST, 73/88.5
[51] Int. Cl. ........................................................... G01r 33/12
[58] Field of Search ............... 324/34 R, 34 ST, 37; 73/88.5, 73/133, DIG. 2

[56] References Cited

UNITED STATES PATENTS 2,005,011   6/1935   Specht ................................. 324/34 R Primary Examiner—Edward E. Kubasiewicz
Assistant Examiner—R. J. Corcoran
Attorney—R. S. Sciascia and Q. E. Hodges

[57] ABSTRACT

A method for determining applied stress, yield stress and residual stress in a magnetic material. The method utilizes the amplitude of an induced third harmonic signal as an indication of the stress. Two measurements of the third harmonic amplitude are made, one for an unstressed and a second for a stressed condition. The amplitude indicative of the stress in the material is compared to the initial third harmonic reading according to a linear relationship to determine the stress.

15 Claims, 7 Drawing Figures

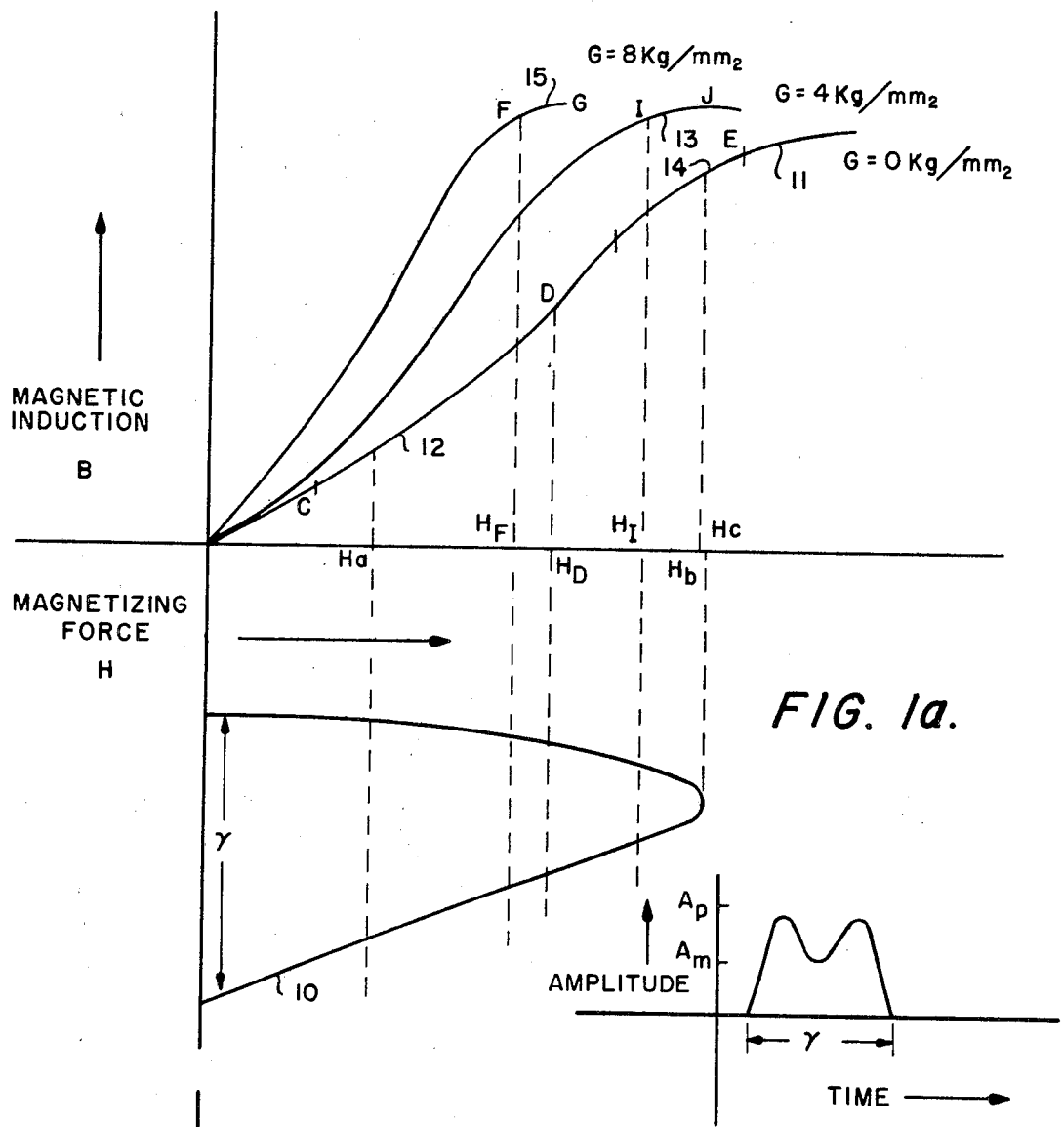
FIG. 1a.
FIG. 1c.
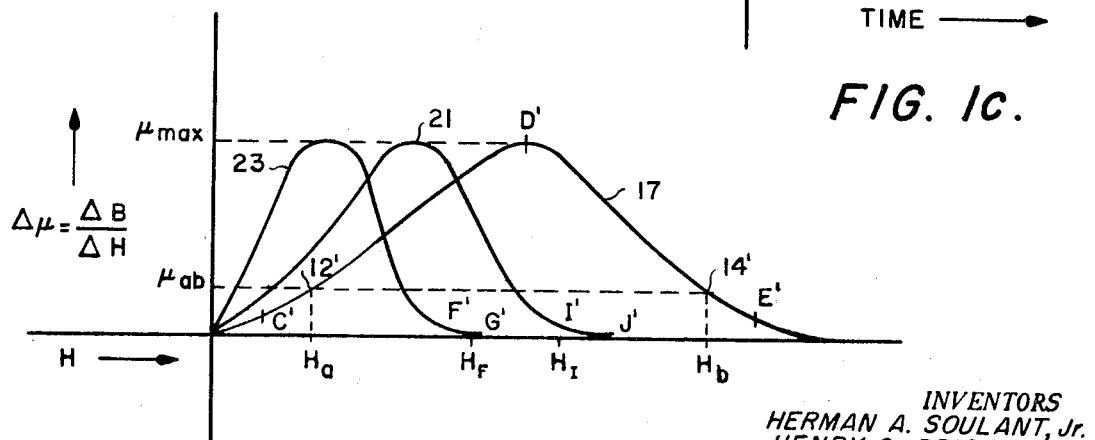
FIG. 1b.
INVENTORS
HERMAN A. SOULANT, Jr.
HENRY C. BRISKER
BY
*D. Hodges*
ATTORNEY

METHODS FOR MAGNETICALLY MEASURING STRESS USING THE LINEAR RELATIONSHIP OF THE THIRD HARMONIC TO STRESS

The invention described herein may be manufactured and used by or for the Government of the United States of America for Governmental purposes without the payment of any royalties thereon or therefor.

BACKGROUND AND SUMMARY OF THE INVENTION

This invention is a method for quickly and efficiently making stress readings where the third harmonic amplitude is utilized as an indication of the stress in the material. An apparatus that may be used in this method is that described in application Ser. No. 872,266, filed Oct. 29, 1969. The device of that application comprises two coils, a driving coil driven by an AC current, a pickup coil, and a meter connected to the pickup coil through a band-pass filter tuned to the third harmonic of the driving current.

Use of the third harmonic signal to indicate stress requires a number of precalibrations to establish the relationship between the third harmonic amplitude and the level of stress. After calibration an error would be present in an actual test measurement of stress as it would be impossible to duplicate under test the conditions existing for the precalibration.

The prior art includes other apparatuses described in U.S. Pat. Nos. 3,356,977 and 3,011,340, which do not utilize the third harmonic. These apparatuses typically include two coils, one a driving coil inducing a time-varying magnetic flux in the material and the other a pickup coil, magnetically linked to the driving coil by the magnetic material under test. If the material is stressed, the permeability of the material and the magnetic linkage is changed producing a change in the readout and indicating the stress of that material.

The absolute permeability of a material is the ratio of magnetic induction B to magnetizing force H. It is typically a curve of decreasing slope at magnetic saturation. At saturation any increase in magnetic force will result in little or no increase in B within the material.

In prior art devices, as in the device of application Ser. No. 872,266, the measurement is dependent upon a time-varying magnetic flux linking two coils. The magnitude of the signal induced in the secondary or pickup coil is dependent upon the rate of change of B or induced flux. The amplitude of the alternating signal induced within the pickup coil will therefore be dependent upon the point in the BH or magnetization curve of the material upon which the magnetic force of the driving coil acts. A typical magnetization curve will show an area of saturation at high values of magnetizing force H where the rate of change of the flux with respect to a given change in magnetic force will be minimum, or the permeability differential: the slope of the magnetization curve, will be substantially zero at saturation. The signal induced in the pickup coil is a function of the rate of changing magnetic flux cutting the pickup coil. The rate of changing flux or the rate of change of B with respect to a given incremental change in H is a function of the slope at the point on the magnetization curve corresponding to the increment, $\Delta H$. The maximum signal will be induced in the pickup coil when the rate of flux change is maximum for an increment of H or where the incremental permeability is maximum and the minimum signal will be induced in the pickup coil when the incremental permeability is minimum. The incremental permeability, or slope of the magnetization, or BH curve, increases to a maximum, corresponding to an increment ($\Delta H$) about a given level of magnetizing force H. For a greater magnetizing force beyond that corresponding to maximum incremental permeability, the incremental permeability decreases and approaches zero at levels of saturating magnetizing force. Incremental permeability plotted against magnetizing force will manifest a "U" shaped characteristic, having a peak about which a change in magnetizing force, $\Delta H$, will produce a maximum change in B. The pickup coil signal is a function of the rate of change in B for an incremental change in magnetizing force, $\Delta H$. Because the permeability curve is "U" shaped, there exist at least two levels of H at which the identical change in B will be produced for identical changes or increments $\Delta H$ about each of the two H points. It can immediately be seen that use of the prior art device over the full range of the BH curve produces the identical increment of B for one incremental value of $\Delta H$ about two distinct levels of H. Because the distinct produced in the pickup coil is a function of the rate of change of B, any one indication of the voltage induced in the pickup coil will be indefinite as it can indicate two distinct levels of magnetizing force producing that reading. Additionally, a prior art device reading the unfiltered pickup coil signal will show no change in output where the material is driven beyond the saturation point on the magnetization curve. Beyond the saturation point, a change in H cannot produce any meaningful change in B. The pickup coil responsive to change in B cannot show any change in output where the material is driven beyond saturation.

The advantage of the invention of application Ser. No. 872,266, over the prior art is that it utilizes the third harmonic of the primary coil currents fundamental frequency. A force upon the test member further distorts its BH curve and causes further generation of a third harmonic. The amplitude of voltage induced in the pickup coil by this third harmonic current indicates the amount of force upon member.

The third harmonic signal amplitude is an increasing function of the magnetic driving force H through the whole range of the magnetization curve, including saturating levels. Utilization of the third harmonic thereby allows an increase in sensing range, over that of the prior art.

In addition, the relationship of stress to third harmonic amplitude is substantially linear. This relationship allows a method for magnetically determining applied stress and remnant stress, without the necessity of a precalibration step, directly from the third harmonic signal amplitude and it also allows a method of magnetically determining ultimate yield stress. It also allows the determination of applied and remnant stress without the necessity of precisely establishing the spatial and magnetic relationships of the driving coil, material, and pickup coil and the level of driving current. All that is required for this method is to place the coils and the material so the material magnetically links the coils to induce a measurable third harmonic signal.

Accordingly, it is one object of the invention to measure stress in a magnetic material without a precalibration step and directly from the amplitude of the third harmonic signal.

It is a second object of this invention to measure remnant stress in a material without precalibration.

It is a third object of this invention to measure stress without the necessity for precise alignments of the pickup coil, driving coil and material and for establishing precise levels of driving current and driving flux.

It is a fourth object of this invention to magnetically determine ultimate yield stress.

Other objects and features of the invention will become apparent to those skilled in the art as the disclosure is made in the following detailed description of the preferred embodiments of the invention as illustrated in the drawings in which:

BRIEF DESCRIPTION OF THE DRAWINGS

FIG. 1a shows a hystersis free BH curve of a magnetic material under various degrees of tension.

FIG. 1b shows the effect of tension on a hystersis free permeability curve of FIG. 1a.

FIG. 1c shows the induced voltage waveform at the sensing coil.

DESCRIPTION OF THE PREFERRED EMBODIMENT

Figure 2:
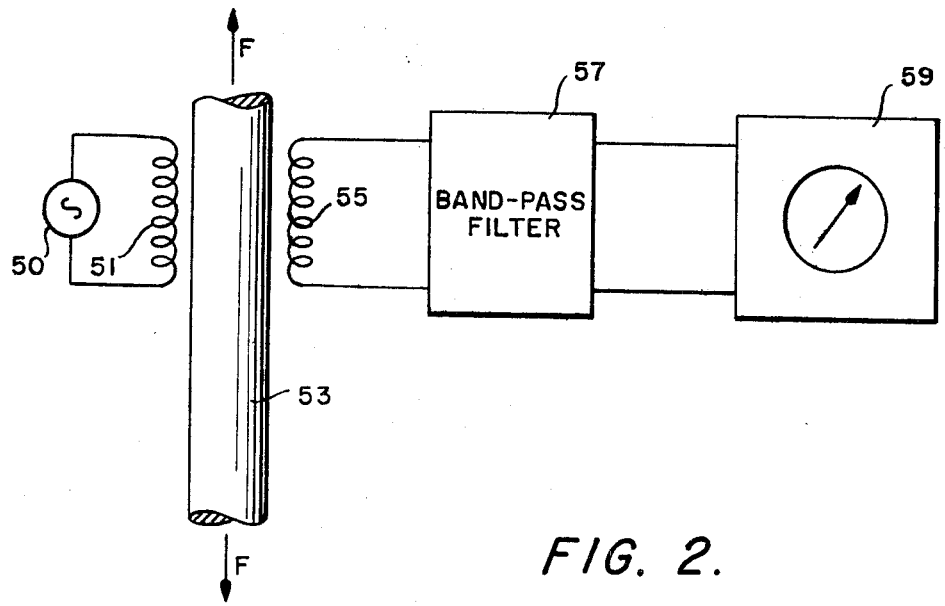
FIG. 2 is an apparatus which may be used to practice this invention.

In FIG. 1a is shown the BH curve for a magnetic material under various degrees of tension. The ordinate is magnetic induction B and the absicca is magnetizing force H. Ten is the waveform of the magnetizing force having a maximum $H_c$ and period $2\gamma$. Absolute permeability is the ratio of B to H or magnetic induction divided by the magnetizing force. The effect of tension on the absolute permeability is shown in FIG. 1a as changing the relationship of B to H. This change in absolute permeability is seen as an increase for an increase in stress is shown by curves 13 for a stress of 4 hg./mm.$^2$ and 15 for a stress of 8 kg./mm.$^2$ compared to curve 11 the absolute permeability curve for zero stress.

Referring now to FIG. 1b wherein is shown the incremental permeability of the material of FIG. 1a or the incremental slope of the BH curve, plotted against H. Curve 17 represents the incremental permeability for the material of FIG. 1a and when the stress is zero. Curve 23 is the incremental permeability for the material under a 4 hg./mm.$^2$ stress. Curve 21 is the incremental permeability curve where the stress is 8 hg./mm.$^2$.

Comparing the relationship of B to H in FIG. 1a to the relationship of incremental permeability shown in FIG. 1b, it can be seen that for a small value of H between zero and point C on curve 11 the slope of the permeability curve or the incremental permeability increases gradually as shown by the curved portion between zero and C' in FIG. 1b. For larger values of field strength as between the points C and D or curve 11 the incremental permeability increases and reaches a maximum at point D where a given change in H will produce a maximum increase in B and corresponds to that portion of curve 17 of FIG. 1b between C' and D'. For still larger values of H, including the saturation point of the material as between points D and E on curve 11 of FIG. 1a the incremental permeability is shown to decrease, turning negative and approaching zero as between points D' and E' on curve 17 of FIG. 1b. This portion of the curve between D' and E' corresponds to an area approaching and within the saturation limits of the material and where an incremental change in B induced by an incremental change in H is a decreasing function as greater magnetizing force H is applied. It can be seen, therefore, that for the major portion of the "U" shaped incremental permeability curve, there are always two points 12' and 14' for example, corresponding to a single value of incremental permeability $\Delta\mu_{ab}$ and, to two distinct levels of H: Ha and Hb. When the full range of the BH curve, as shown in FIG. 1a, is utilized to detect changes in the incremental permeability caused by stresses acting upon the material, a single value of incremental permeability will correspond to equal incremental changes of H about two distinct levels of H, Ha and Hb.

When the magnetizing force 10 drives a material having a magnetization curve 11 beyond the point D on the magnetization curve, corresponding to the maximum incremental permeability, $\mu$max, the rate of flux change will decrease resulting in a corresponding decrease in the signal induced in the pickup coil. The waveform of the sensing coil signal shown in FIG. 1c will have a peak amplitude at the point in time the magnetizing force reaches an amplitude $H_D$ corresponding to the point of maximum incremental permeability D'. As the magnetizing force increases beyond $H_D$, the corresponding incremental permeability and the signal amplitude will decrease to level $A_m$ where the amplitude of the magnetizing force is maximum $H_c$. As the amplitude of the magnetizing force decreases to a level corresponding to the point of maximum incremental permeability of the material, the signal amplitude will increase to a peak value $A_p$ and then decrease to zero. Magnetizing forces having a peak at $H_D$ will induce signals in the pickup coil having a peak amplitude $A_p$ and magnetizing forces having peak values below $H_D$ will induce signals in the pickup coil of amplitudes less than $A_p$. For magnetizing force levels up to and including $H_D$, the signal waveform induced will be an increasing function proportional to an increasing magnetizing force. However, at magnetizing force levels above $H_D$, the waveform will manifest a dip $A_m$ and two peaks $A_p$.

When measuring the induced signal, whether measuring RMS, or average voltage a meter reading obtained by a suitable meter connected to a pickup coil will be indicative of two magnetizing waveforms, one having a peak value corresponding to a point on the magnetization curve between the zero axis and the point of maximum incremental permeability and a second having a peak value corresponding to a point on the magnetization curve between the maximum permeability point and saturation. It is seen therefore that sensing an unfiltered signal induced in the pickup coil produces an ambiguous reading. Also if the peak to peak value of the induced signal is read, then for any magnetization levels above $H_D$, the reading would be a constant $A_p$.

Additionally, where stress upon the material further distorts the magnetization curve, the magnetizing force 10 may drive the material beyond saturation as shown by portions F–G of curve 15 of FIG. 1 and corresponding curve portion F'–G' of curve 23 of FIG. 2 and portions I–J or curve 13 of FIG. 1 and corresponding portion I'–J' of curve 21 of FIG. 2. The raw, unfiltered pickup coil signal will show no discernible increase in output for magnetizing force levels beyond saturation. However, the third harmonic amplitude of the magnetizing current's fundamental frequency is an increasing function of the magnetizing force produced by this current, within the whole range of the magnetization curve, including the region of saturation. By filtering the output of the pickup coil for the third harmonic and sensing the third harmonic amplitude, amplitude changes proportional to stress changes may be detected in the saturated region of the material or where the stress so distorts the magnetization curve that the maximum magnetizing force applied is greater than the saturating force: $H_F$ for curve 15 and $H_I$ for curve 13.

Referring now to FIG. 2 wherein is shown a device which may be used to practice this invention, having a signal generator 50 providing an amplitude modulated current at a fundamental carrier frequency to primary coil 51. Coil 51 induces a magnetic flux of varying waveform corresponding to the waveform of signal generator 50, within the magnetic material 53. The magnetic material 53 magnetically links coil 51 and secondary coil 55. The rate of change of flux linkage across coil 55 induces a signal within it. 57 is a band-pass filter tuned to the third harmonic of the carrier and is connected to the output of secondary coil 55. Meter 59 connected to the output of the filter 57, reads the strength of the third harmonic signal and is calibrated in units of stress. Meter 59 may combine sensing units and storage units and process the stored information according to a predetermined relationship.

If the member 53 is stressed, its BH curve will undergo distortion as shown by curves 13 and 15 of FIG. 1a, causing generation of a third harmonic signal. This third harmonic signal is sensed by secondary coil 55. The strength of the induced signal in 55 is proportional to the rate of change of B (magnetic flux) across coil 55. The induced signal is filtered to pass the third harmonic by band-pass filter 57 and ready by meter 59 producing an indication of the forces within the member 53.

Figure 3:
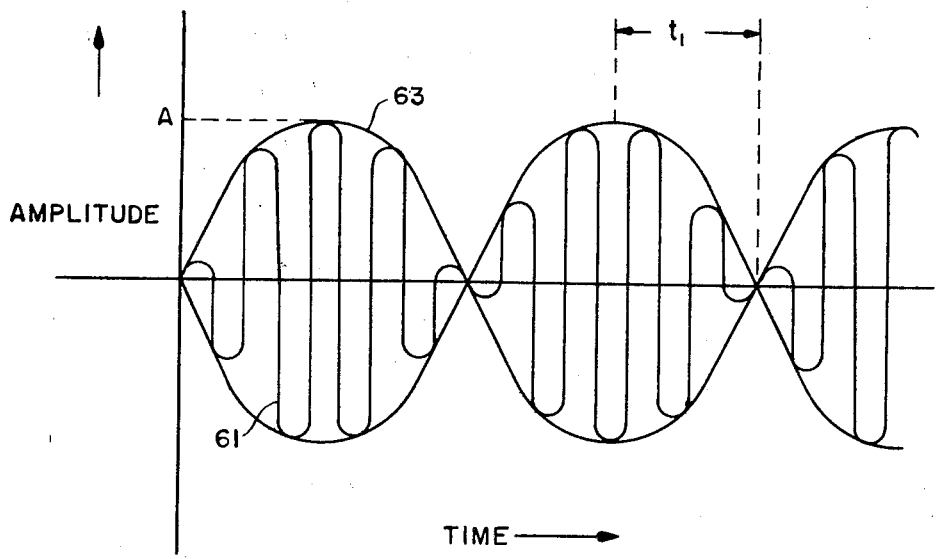
FIG. 3 is the wave form of the magnetizing force current.

FIG. 3 is a waveform of the modulated signal produced by generator 50. It is composed of a fundamental carrier frequency 61 and an amplitude modulating frequency 63. Modulating frequency 63 is lower than the carrier frequency. Distortion of the BH curve produces the third harmonic of the fundamental frequency or carrier frequency 61. The signal amplitude variations of the fundamental frequency signal 61 produced by modulating signal 63, erases remnant magnetism twice during each period of the modulating frequency waveform between the points in time of maximum modulating signal amplitude and zero amplitude or the period $t_1$ shown in FIG. 3.

Figure 4A:
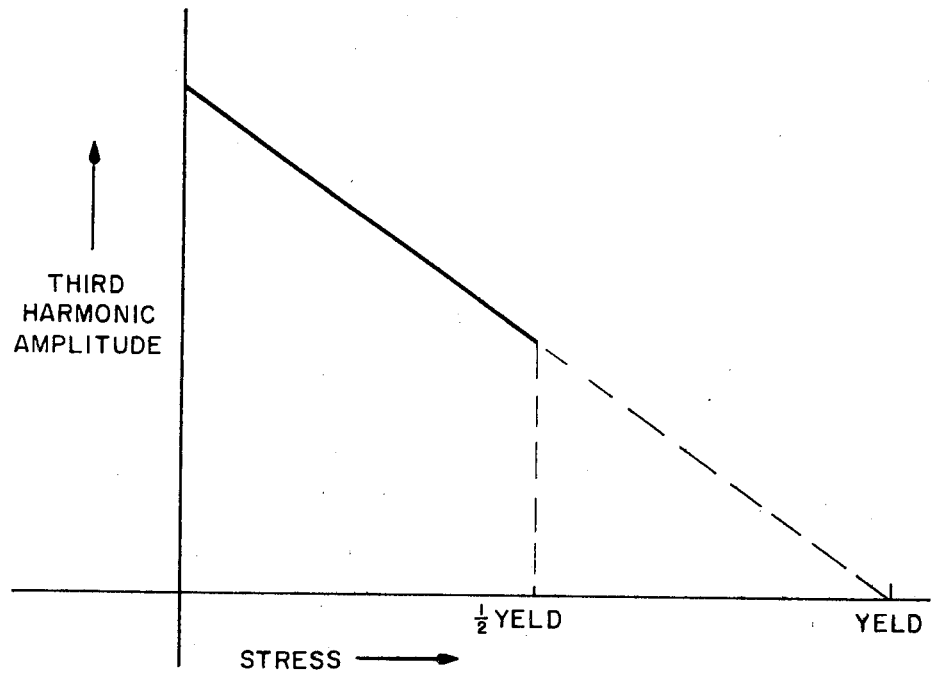
FIG. 4a shows the negative effect of stress on the amplitude of the third harmonic.

Referring now to FIG. 4a wherein is shown the amplitude of the third harmonic induced in the pickup coil decreasing as increasing stress is applied to the material and 4b wherein is shown the third harmonic amplitude increasing for increasing stress applied to the material.

Figure 4B:
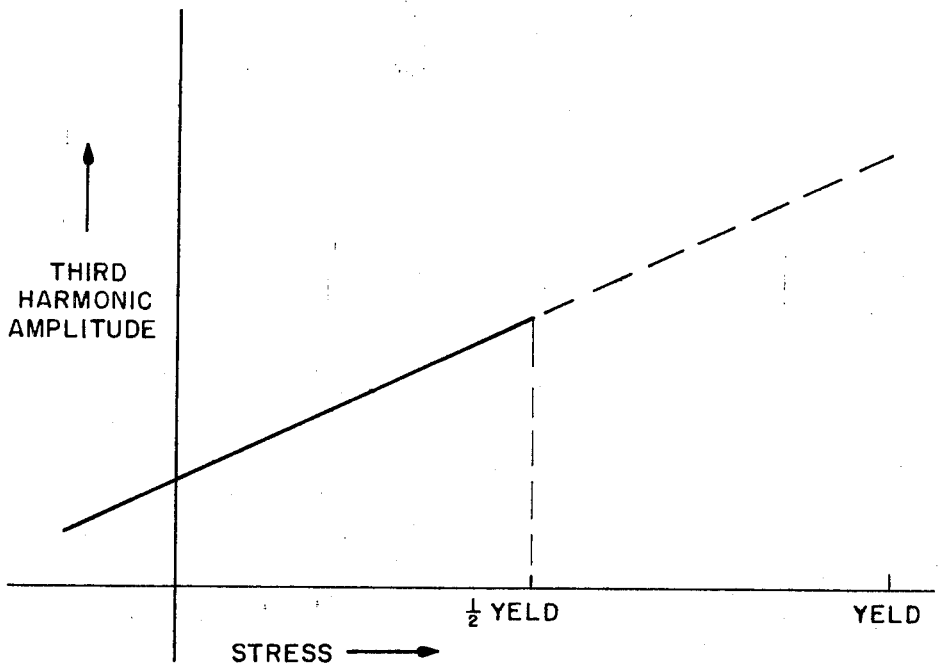
FIG. 4b shows the positive effect of stress on the amplitude of the third harmonic.

FIGS. 4a and 4b represent two possibilities of the effect of stress upon the third harmonic response and is dependent upon the type of material employed. Some material exhibit a positive stress-amplitude relationship as shown in FIG. 4b while other materials will exhibit a negative stress-third harmonic amplitude relationship as shown in FIG. 4a. The positive relationship as shown in FIG. 4b results in an increasing third harmonic amplitude for increase in stress while the negative relationship results in a decreasing third harmonic amplitude for increasing stress on the material. The relationship between third harmonic amplitude and stress is a function of the nature of the material.

METHOD OF OPERATION

The method of operation hereinafter described does not depend upon a precalibration curve of third harmonic amplitude values for precise values of stress applied to a material nor does it require that in actual test conditions the induction coil, pickup coil and a magnetic material be precisely positioned relative to each other or be positioned relative to each other to duplicate the positioning of a calibration positioning nor is precise predetermined driving levels of magneto-motive force required. The method of operation is a simple and expedient method that requires only that the induction and pickup coils and the magnetic material be positioned and driven so that a measurable third harmonic amplitude is produced and that the yield stress of the material be known. Stress upon the material, yield stress and remnant stress within the material placed in the structure can then be determined as follows:

Case 1:

Determining applied stress to a material where the relationship between third harmonic amplitude and the stress is positive as shown in FIG. 4b.

The induction coil 51, the pickup coil 55 and the magnetic material 53 are positioned so that generator 50 providing the driving current to induction coil 51 will produce measurable third harmonic amplitude signals in pickup coil 55 as read on meter 59.

Using this method, first the third harmonic amplitude is recorded for a zero stress applied to the material. Second, the unknown stress is applied to the material and the third harmonic amplitude produced by the unknown stress recorded. The unknown stress, $S_x$ is then derived from the relationship:

$$S_x = S_y x \frac{e_x - e_0}{2e_0}$$

where $S_y$ is the yield stress, $e_o$ is the third harmonic amplitude for zero stress, and $e_x$ is the third harmonic amplitude produced by the unknown stress.

Case 2:

Determining the applied stress to the material where the third harmonic is a negative function of the applied stress as shown in equation 4a.

The pickup coil 55, induction coil 51 and magnetic material 53 are positioned to produce a measurable third harmonic output when the induction coil 51 is driven by current generator 50.

Using this method first the third harmonic amplitude is recorded for zero stress. Second, the stress is applied and the third harmonic amplitude for the unknown stress is recorded. The unknown stress, $S_x$ is then derived from the relationship:

$$S_x = \frac{e_x}{e_0} x S_y$$

where $e_o$ is the third harmonic amplitude for zero stress, $e_x$ is the third harmonic amplitude for the unknown stress and $S_y$ is the yield stress.

Case 3:

Determining the remnant stress within a material where the third harmonic amplitude is a positive function of the stress in the material as shown in 4b. The induction coil 51, pickup coil 55, magnetic material 53 are positioned so that when induction coil 51 driven by generator 50 produces a measurable third harmonic output in pickup coil 55.

Using this method, first an initial third harmonic amplitude is recorded with the material subject only to remnant stress, second a known incremental stress be applied to the material and the third harmonic amplitude is recorded with the known incremental stress applied to the material.

The remnant stress is then given by the relationship:

$$S_R = \tfrac{1}{2} S_y + \frac{S_i}{e_i - e_0} x e_i$$

where $S_y$ is the yield stress, $e_o$ is the initial third harmonic amplitude, $e_i$ is the third harmonic amplitude produced when the material is subjected to the incremental stress and $S_i$ is the incremental stress.

Case 4:

Determining a remnant stress where the third harmonic amplitude is a negative function of an increase in stress as shown in FIG. 4a.

Using this method first, an initial third harmonic amplitude is read when the material is subjected to remnant stress. Second, the material is subjected to an incremental stress and the third harmonic amplitude is read. The remnant stress $S_R$ is then determined from the following relationships:

$$S_R = S_y - \frac{e_0}{e_0 - e_i} x S_i$$

where $e_o$ is the initial third harmonic amplitude, $e_i$ is the third harmonic amplitude produced when the material is subjected to the incremental stress, $S_y$ is the yield stress and $S_i$ is the incremental stress.

Case 5:

Magnetically determining the ultimate yield stress where the relationship between the third harmonic amplitude and stress is positive, as shown in FIG. 4b.

Using this method, first the third harmonic amplitude is determined when the material is at zero stress. Second the known incremental stress is applied and the third harmonic amplitude is determined with the material subjected to the known incremental stress. The yield stress is then derived from the following relationship:

$$S_y = \frac{2e_0}{e_i - e_0} x S_i$$

where $S_y$ is the yield stress, $e_o$ is the third harmonic amplitude at zero stress, $e_i$ is the third harmonic amplitude when the material is subjected to the incremental stress and $S_i$ is the incremental stress.

Case 6:

Magnetically determining ultimate yield stress where the relationship between third harmonic amplitude and stress is negative as shown in FIG. 4a.

Using this method, first and third harmonic amplitude at zero stress is determined. Second, the material is subjected to a known incremental stress and the third harmonic amplitude is determined.

The yield stress is then derived according to the following relationship:

$$S_y = \frac{e_0}{e_0 - e_i} x S_i$$

where $S_y$ is the yield stress, $e_o$ is the third harmonic amplitude when the material is subjected to the incremental stress and $S_i$ is the incremental stress.

These foregoing methods may employ a meter designed to reduce a reading in units of stress or the third harmonic voltage amplitude and incremental stress values may be converted to suitable digital signals for storage and processing in a digital computer.

Obviously many modifications and variations of the present invention are possible in the light of the above teachings. It is therefore to be understood that within the scope of the appended claims the invention may be practiced otherwise than as specifically described.

What is claimed is:

1. A method for measuring stress within a magnetic material comprising the steps of:
   inducing a cyclically varying magnetic flux field within a magnetic material;
   inducing a signal in a transducer placed with the magnetic flux field;
   filtering the transducer signal for the third harmonic of the cyclically varying field;
   detecting the third harmonic signal when zero stress is applied to the magnetic material;
   detecting the third harmonic signal when an unknown stress is applied to the magnetic material; and
   processing the signals of the third harmonic amplitude at zero stress and at the unknown stress in accordance with a linear relationship existing between the third harmonic amplitude and the stress to derive the unknown stress value.

2. The method of claim 1 wherein the linear relationship is:

$$S_x = S_y x \frac{e_x - e_o}{2e_o}$$

where $S_y$ is the yield stress of the material, $e_o$ is the third harmonic amplitude at zero stress, $e_x$ is a third harmonic amplitude at the unknown stress, and $S_x$ is the unknown stress.

3. The method of claim 1 wherein the linear relationship is:

$$S_x = \frac{e_x}{e_o} x S_y$$

where $S_y$ is the yield stress, $e_o$ is the third harmonic amplitude at zero stress, $e_x$ is the third harmonic amplitude at the unknown stress and $S_x$ is the unknown stress.

4. A method for measuring remnant stress within a magnetic material comprising the steps of:
   inducing a cyclically varying magnetic flux within a magnetic material;
   inducing a signal in a transducer placed within the magnetic flux field;
   filtering the transducer signal for the third harmonic of the cyclically varying flux field; detecting the third harmonic signal when the material is subject to the remnant stress;
   subjecting the magnetic material to a known incremental stress;
   detecting the third harmonic signal when the material is subjected to the known incremental stress; and
   processing the third harmonic signals produced at remnant stress, the third harmonic signal produced when a known incremental stress is applied to the material and the value of the yield stress, according to a linear relationship existing between stress and third harmonic amplitude to derive the value of remnant stress.

5. A method of claim 4 wherein the linear relationship is:

$$S_R = S_y - \frac{e_o}{e_o - e_i} x S_i$$

where $S_y$ is the yield stress, $e_o$ is the initial third harmonic voltage where the material is subjected to remnant stress, $S_i$ is the known incremental stress, $e_i$ is the third harmonic amplitude produced when the material is subjected to the incremental stress.

6. The method of claim 4 wherein the linear relationship is:

$$S_R = \tfrac{1}{4} S_y + \frac{S_i}{e_i - e_o} x e_i$$

where $S_y$ is the yield stress, $e_o$ is the third harmonic amplitude produced by the remnant stress, $e_i$ is the third harmonic amplitude produced when the material is subjected to an incremental stress, and $S_i$ is the incremental stress.

7. The method of claim 2 wherein the relationship between stress and third harmonic amplitude is positive.

8. The method of claim 3 wherein the relationship between the third harmonic amplitude and stress is negative.

9. The method of claim 5 wherein the relationship between stress and the third harmonic is negative.

10. The method of claim 6 wherein the relationship between the third harmonic amplitude and stress is negative.

11. A method for measuring yield stress within a magnetic material comprising the steps of:
    inducing a cyclically varying magnetic flux field within a magnetic material;
    inducing a signal in a transducer placed within the field;
    filtering the signal for the third harmonic of the cyclically varying field;
    detecting the third harmonic signal when zero stress is applied to the magnetic material;
    detecting the third harmonic signal when a known incremental stress is applied to the magnetic material; and
    processing the signals recorded of the third harmonic amplitude at zero stress and at the known stress in accordance with the linear relationship existing between the third harmonic amplitude and the stress to derive the yield stress value.

12. The method of claim 11 wherein the linear relationship is:

$$S_y = \frac{2e_o}{e_i - e_o} x e_i$$

where $S_y$ is the yield stress, $e_o$ is the third harmonic amplitude at zero stress, $e_i$ is the third harmonic amplitude when the material is subjected to the incremental stress; and $S_i$ is the incremental stress.

13. The method of claim 11 wherein the linear relationship is:

$$S_y = \frac{e_o}{e_o - e_i} x S_i$$

where $S_y$ is the yield stress, $e_o$ is the third harmonic amplitude at zero stress, $e_i$ is the third harmonic amplitude when the material is subjected the yield incremental stress, and $S_i$ is the incremental stress.

14. The method of claim 12 wherein the relationship between the third harmonic amplitude and stress is positive.

15. The method of claim 13 wherein the relationship between the stress and the third harmonic is negative.

* * * * *